H. F. SCHMIDT.

FLUID TRANSLATING DEVICE.

APPLICATION FILED MAR. 3, 1921.

Reissued Mar. 21, 1922. 15,315.

Henry F. Schmidt
INVENTOR

BY D. C. Davis
ATTORNEY

UNITED STATES PATENT OFFICE.

HENRY F. SCHMIDT, OF SWARTHMORE, PENNSYLVANIA, ASSIGNOR TO WESTINGHOUSE ELECTRIC AND MANUFACTURING COMPANY, A CORPORATION OF PENNSYLVANIA.

FLUID-TRANSLATING DEVICE.

15,315. Specification of Reissued Letters Patent. Reissued Mar. 21, 1922.

Original No. 1,333,346, dated March 9, 1920, Serial No. 861,639, filed September 14, 1914. Application for reissue filed March 3, 1921. Serial No. 449,534.

*To all whom it may concern:*

Be it known that I, HENRY F. SCHMIDT, a citizen of the United States, and a resident of Swarthmore, in the county of Delaware and State of Pennsylvania, have made a new and useful Invention in Fluid-Translating Devices, of which the following is a specification.

My invention relates to ejecting devices and particularly to nozzles for delivering motive fluid to the working passages of fluid translating devices of the kinetic type, such for example as air ejectors, and it has for an object to provide improved means for accelerating the medium to be ejected or compressed to the velocity of the ejecting fluid. A further object is to provide a fluid-expanding nozzle in which means are employed for automatically varying the effective discharge area with relation to the throat area in response to variations in the initial and final pressures over which the nozzle operates, thereby avoiding losses resulting from under expansion when the outlet area is too small and resulting from shock due to over-expansion and recompression when the outlet area is larger than that necessary.

These and other objects which will be made apparent throughout the further description of the invention, are attained by means of ejecting devices employing the features herein described and illustrated in the drawings accompanying and forming a part of this application.

Figure 1:
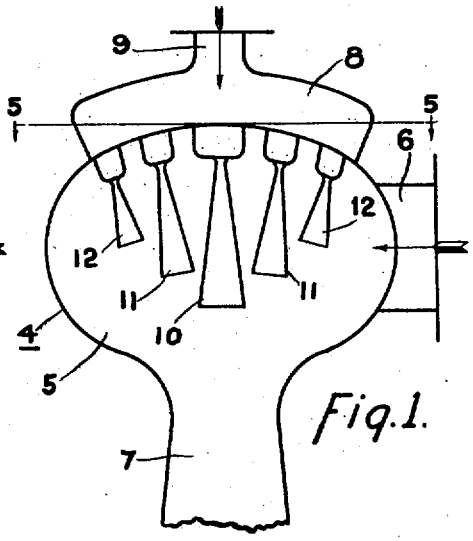
Figure 1 is a diagrammatic fragmental sectional view of an ejector equipped with a series of nozzles embodying one form of my invention.
Figure 5:
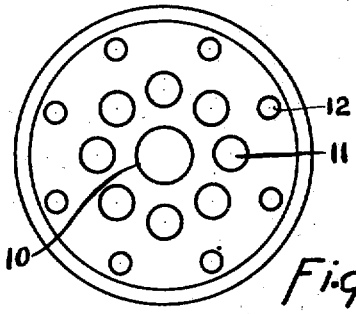
Figure 3:
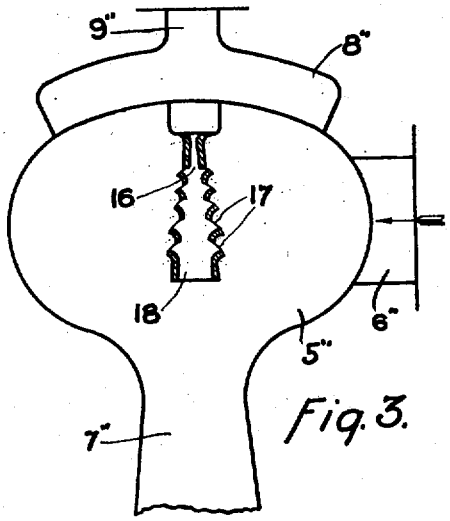
Figure 4:
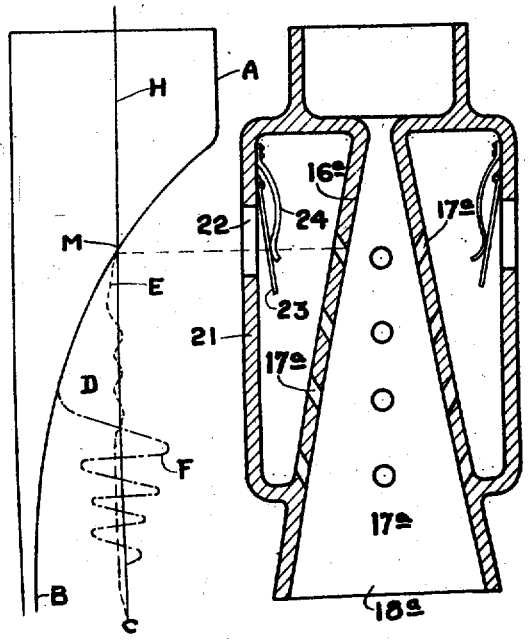

Fig. 3 is a similar view of an ejector equipped with a nozzle embodying a modification of my invention, in which means are employed for varying the ratio of the effective outlet area with relation to the inlet area of the nozzle, in response to variations in the initial or in the final pressure to which the nozzle is subjected; and Fig. 4 is an enlarged sectional view of the nozzle shown in Fig. 3 in connection with a pressure diagram illustrating the principle of operation of the nozzle shown, as an embodiment of the invention in Fig. 3, and Fig. 5 is a sectional view along the line 5—5 of Fig. 1.

Figure 2:
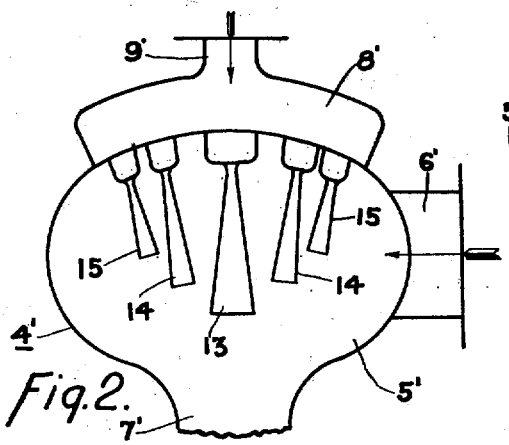
Fig. 2 is a similar view of an ejector equipped with a series of nozzles and embodying a modification of my invention.

Referring to Figs. 1, 2 and 5 of the drawing, the apparatus illustrated consists of a casing 4, having a combining or suction chamber 5, to which fluid to be ejected is delivered through a port 6, and a diffuser 7 communicating with the chamber and shown broken away for convenience of illustration. A series of fluid delivery nozzles is shown extending into the casing 4 and communicating with a pressure chamber 8, which receives fluid under pressure from any suitable source through a port 9. Each of the nozzles communicating with the pressure chamber 8 is provided with a divergent mouth-piece but the nozzle ratio of the different nozzles may be varied in accordance with the position of the nozzle in the casing 4. By nozzle ratio I mean the effective area of the outlet of the nozzle divided by the effective area of the nozzle throat or of the contracted cross-section of the nozzle.

It is a well-known principle of mechanics that the momentum after the impact of two bodies is equal to the sum of momenta of the two bodies before the impact. It is also a well known principle that the loss of kinetic energy resulting from the shocks when two bodies moving at different velocities collide, increases with the difference in the velocity of the two bodies prior to the collision. For these reasons an object of my invention is the production of a series of nozzles for entraining a fluid to be ejected, such that the velocity of the fluid to be entrained is gradually increased to a velocity near that of the ejecting medium. The term eject is employed throughout this specification in a generic sense to indicate the process of translating a fluid medium from a region of relatively low to a region of relatively high pressure by the employment of the kinetic energy of a pressure fluid.

One of the fundamental conditions in ejectors is that the medium to be removed or ejected is practically at rest, whereas the ejecting medium is moving at a high velocity. A mixture of these two media will occasion considerable loss in energy, and to reduce this loss, I contemplate increasing the velocity of the fluid to be ejected by subjecting it to the action of relatively small streams of motive fluid prior to bringing it in contact with the main and relatively large stream of ejecting fluid.

In Fig. 1, I have shown an arrangement of nozzles consisting of a main ejecting nozzle 10, which is surrounded by an annular series of shorter nozzles 11. These nozzles are preferably inclined inwardly toward the nozzle 10 so that the fluid discharged by them is more readily capable of uniting with the stream of fluid discharged from the nozzle 10 to form a single stream. I have also shown an annular series of nozzles 12 around the nozzles 11 which, like the nozzles 11 are inclined inwardly or toward the nozzle 10, and which are adapted to discharge jets of fluid inwardly toward the jet discharged from the nozzle 10. These nozzles 12 are shorter than the nozzles 11 and it is desirable, although not essential, to so space the nozzles in each of the annular series that the fluid discharged by the nozzles of each series forms a substantially annular stream. This spacing is illustrated in Fig. 5. All of the nozzles 10, 11 and 12 have the same expansion ratio, but the nozzles 11 are so proportioned that each discharges a relatively small amount of fluid as compared with the amount of fluid discharged by the nozzle 10, and each nozzle 12 is so proportioned, that it discharges a smaller quantity of fluid than is discharged by any one of the nozzles 11.

With this arrangement, the fluid or medium to be ejected and existing in the chamber 5 is first subjected to the action of the fluid issuing from the nozzles 12, and the entraining effect of this fluid imparts initial velocity to the medium to be ejected.

As the medium, so entrained, moves toward the throat of the diffuser 7, it is successively subjected to the entraining effect of the fluid discharged by the nozzles 11 and by the nozzle 10 so that the velocity is gradually increased as it moves from the chamber 5 into the throat of the diffuser 7. By thus gradually increasing the velocity of the medium to be ejected or entrained, the loss in energy is materially reduced over that encountered in ordinary ejectors, since the difference between the velocity of the entrained medium and the velocity of the main ejecting jet is materially reduced at the time the entrained medium is subjected to the action of the main ejecting jet. The loss of energy occasioned by the shock resulting from the entrainment of the medium to be ejected by the jets delivered from the nozzles 12, is relatively small as compared with the available energy of all the nozzles, and the same is true of the loss occasioned by the entrainment of the medium by the jets discharging from the nozzles 11; consequently the efficiency of the organized apparatus is materially higher than the efficiency of ejector nozzles ordinarily employed, in which no means are utilized for imparting velocity to the medium prior to subjecting it to the action of the main ejecting jet.

When it is remembered that the medium existing in the chamber 5 is ordinarily in a highly rarefied state, it will be understood that considerable difficulty is encountered in entraining it since, if the main ejecting jet is spread so as to increase its entraining area, its efficiency is materially reduced by reason of the fact that it must be recombined before passing through the throat of the diffuser. In order to obviate the loss occasioned by spreading or subdividing the main ejecting jets to obtain sufficient entraining area, and at the same time to obtain sufficient entraining area, I provide nozzles which discharge relatively small amounts of motive fluid or steam as compared with the motive fluid or steam discharged by the main ejecting nozzle and I construct these smaller nozzles that the steam discharged by them is under, or incompletely expanded. With this arrangement, a relatively small quantity of steam is, in effect, exploded as it issues from its discharge nozzles, thereby expanding or spreading out so that the entraining area of the combined jets discharged by all of the nozzles is materially increased, while the velocity and integrity of the major portion of the jet is unaffected.

In Fig. 2 I have shown an arrangement of nozzles for accomplishing this. The apparatus illustrated in Fig. 2 consists of a casing 4′ having a suction or combining chamber 5′, which communicates with a port 6′, and a diffuser 7′ and into which a series of nozzles, comprising a central nozzle 13, an annular series of nozzles 14 and an annular series of nozzles 15 project. The central nozzle 13 is preferably located concentrically with relation to the diffuser 7′ and the nozzles 14, like the nozzles 11, surround the central nozzle, but are shorter than the central nozzle and have a smaller nozzle ratio. The nozzles 15 are shorter than the nozzles 14 and have a smaller nozzle ratio than these nozzles. As in Fig. 1, the nozzles of each annular series are inclined inwardly toward the central nozzle and they are preferably so arranged that the separate jets discharged by them unite to form an annular jet. The fluid issuing from the nozzles 15 is under, or incompletely, expanded and consequently is capable of expanding freely within the chamber 5 after it issues from the nozzles. This free expansion causes it to expand or spread by the formation of eddies along the boundary of the jet and consequently increases its efficiency as an entraining agent. The same is true of jets discharged from the nozzles 14, although the ratio of expansion of these nozzles is greater and consequently the free expansion of the fluid issuing from them is somewhat diminished, but the velocity of fluid is higher so that the entrained fluid is gradually accelerated as it passes toward the jet discharged from the nozzle 13 and is subjected first to the action of the jet issuing from the nozzles 15 and then to the action of the jets issuing from the nozzles 14. The expansion ratio of the central nozzle 13 is such that the fluid issuing from it is expanded to substantially the pressure normally existing in the chamber 5′, consequently the jet of fluid discharged by it has the maximum velocity possible under the existing operating conditions and passes through the diffuser with a minimum loss of energy.

By so proportioning the effective areas of the nozzles 14 and 15, relatively to the effective area of the nozzle 13, the major portion of the steam forming the combined jet traversing the diffuser may be discharged from the nozzle 13, and consequently the losses occasioned by the free expansion for the purpose of increasing the entraining efficiency of the jet, will be comparatively small.

If desired, the effective areas of the nozzles 14 and 15 may be proportioned as described in connection with the nozzles 12 and 11 in Fig. 1, or a combination of the apparatus disclosed in Figs. 1 and 2 may be employed for the purpose of obtaining the advantages inherent in each apparatus.

In Fig. 3, I have shown an ejector employed with a central nozzle 16, which is provided at points along its divergent mouth piece with annular series of ports 17, which are more clearly illustrated in the cross-sectional view forming part of Fig. 4. These ports 17 are located between the throat of the nozzle and the outlet 18 and establish communication between the interior of the nozzle and the space into which the nozzle discharges.

In Fig. 4, I have shown a modification $16^a$ of the nozzle 16 having annular series of ports $17^a$ corresponding to the ports 17 of Fig. 3.

With this arrangement the nozzle ratio is automatically varied for variations in operating conditions; that is, pressure variations in the pressure chamber 8″, or pressure variations in the chamber 5″, or at the outlet $18^a$ of the nozzle.

In Fig. 4 I have shown pressure diagrams illustrating the operation of the nozzle under the varying conditions and also the operation of an ordinary form of nozzle which does not embody my invention when it is subjected to conditions other than those for which it was designed. The pressure diagram is shown in connection with the cross-section of a nozzle embodying my invention in such a manner that the pressures at various parts on the diagram correspond to those which would obtain in a nozzle such as that illustrated. In the pressure diagram, expandible fluid is admitted to the nozzle $16^a$ at a pressure A in the diagram and in traversing the nozzle expands along the pressure line ADB to the lower pressure B for which the outlet area $18^a$ of the nozzle is designed. Now, should the lower pressure to which the nozzle must expand be increased to a pressure C indicated by the line CH on the diagram, a nozzle not fitted with the openings, as shown in the nozzle illustrated, would expand the steam to some pressure, such as D, below the line HC (that is over expand) and then, owing to the fact that the area of the divergent mouth piece is larger than necessary for expansion to the pressure C, compression shocks, as indicated by the dot-dash line at F, would occur within the nozzle, recompressing the medium to the pressure C, at which it would be discharged from the nozzle outlet $18^a$. The compression shocks would, however, cause a serious loss of energy in the nozzle and the velocity with which the medium would leave the outlet of the nozzle would be considerably below that which it would have acquired in expanding from the pressure A to the pressure C in a nozzle properly proportioned for such an expansion.

By employing the different series of holes $17^a$ in the nozzle, as shown in Fig. 4, the medium in the space surrounding the nozzle into which the latter discharges can enter the nozzle at different positions along its mouth piece. Thus, with a nozzle so formed, the medium when expanding from a pressure A to a pressure C would expand along the line AME, the pressure at the point E falling slightly below the pressure C, and slight recompression shocks would occur in the nozzle beyond the point E, but these would be of comparatively slight extent and would result in comparatively slight losses, due to the fact that when the pressure beyond the point M tends to fall below that in the space surrounding the nozzle, medium from outside the nozzle flows from the holes $17^a$, as indicated in Fig. 4 by shaded lines within the nozzle, forming a moving filler which extends from that point in the nozzle where the pressure falls to that of the space surrounding the nozzle to the mouth of the nozzle. This, in effect, reduces the area of the outlet of the nozzle to that of the mouth piece at the point at which the pressure falls to that of the surrounding medium, or the pressure C.

If, however, the pressure to which the nozzle $16^a$, fitted with holes $17^a$, expands, is a pressure B, the pressure at every point in the nozzle being above B, none of the medium surrounding the nozzle will enter the holes 17ª, but escape of medium from within the nozzle to the surrounding space is very largely, if not entirely prevented by the slope of the holes 17ª, which is in the direction of flow in the nozzle. Thus it will be evident that under all conditions of operation a maximum efficiency of the nozzle is obtained.

In Fig. 4 I have shown positively acting means for preventing a flow of fluid from the nozzle out through the feeder holes 17ª into the chamber 5″. The means illustrated consists of a chamber enclosed by a wall 21 and which surrounds the nozzle and communicates with the outer ends of the openings 17ª. The wall is provided with one or more ports 22, each of which is controlled by a check or flap valve 23, which in turn is controlled by a spring 24, and is arranged to permit a flow of fluid or medium into but to prevent a flow of medium from the chamber. It will be understood that the drawing is merely illustrative, that the wall 21 extends entirely around the nozzle and that each annular series of openings may be segregated by a separate annular wall and be provided with a separate controlling valve 23.

While there is, of course, some loss of energy in the nozzle, due to the mixture of high velocity and low velocity medium, the loss so resulting is considerably less than the loss of energy which results from the recompression shock in a nozzle not equipped with the filling holes 17ª.

In my co-pending application Serial No. 861,630, filed September 14, 1914, and entitled "Fluid translating devices," I have disclosed and claimed an ejector in which means are provided for varying the effective area of a nozzle of the ejector in accordance with variations in the amount of fluid to be ejected, and in which means are provided for varying the expansion ratio of the nozzle. The ejector described and illustrated is provided with a needle valve which extends through the steam inlet chamber into the throat of the nozzle and is controlled by a piston subjected on one side to the pressure of the fluid entering the ejector, and on the other side to the pressure of the fluids passing through the diffuser. Variations in the differential pressure acting on the piston cause the needle valve to move into or out of the nozzle, thereby changing the effective area and expansion ratio of the nozzle.

In my copending application for "Fluid translating devices," Serial No. 861,631, filed September 14, 1914, I have disclosed and claimed an ejector in which the main nozzle is surrounded by accelerating nozzles, the flow of motive fluid to the accelerating nozzles being controlled by means responsive to variations in amount of the fluid to be ejected, the position of the main nozzle being controlled by the same means. The position of the main nozzle is controlled by a piston subjected on one side to the pressure of the fluid to be ejected, and on the other side to the pressure of the fluids passing through the ejector. The main nozzle is provided with a tubular extension in which are ports for controlling the flow of motive fluid to the accelerating nozzles.

In my copending application for "Fluid translating devices," Serial No. 861,633, filed September 14, 1914, I have disclosed and claimed an ejector in which means are provided for varying the effective area and position of the throat of a diffuser. Several embodiments of the invention are disclosed but in all of them the nozzle is moved in relation to the diffuser by means of a piston exposed on one side to the pressure of the fluid to be ejected and on the other side to the pressure of the fluids in the diffuser. The nozzle may become substantially an extension to the diffuser thereby changing the effective area and throat of the diffuser.

It will, of course, be understood that a nozzle embodying the features illustrated in connection with the nozzle 16 may be employed as central nozzle in apparatus embodying the features illustrated in either Figs. 1 or 2 or in apparatus embodying the features illustrated in both Figs. 1 and 2. It will also be understood that the shorter or accelerating nozzles of either Figs. 1 or 2 may be equipped with filler apertures for admitting a fluid sheath of the medium surrounding the nozzle, and that my invention contemplates an apparatus embodying the features of the apparatus illustrated in Figs. 1, 2 and 3.

What I claim is:

1. In combination in an apparatus of the character described, a chamber having an inlet port through which medium to be translated is admitted, means for expelling medium from said chamber, and for gradually accelerating the medium in the chamber, comprising groups of nozzles of different lengths, and of different areas, the outer groups of nozzles having successively smaller areas than the inner groups.

2. In combination in an apparatus of the character described, a chamber having an inlet port through which medium to be expelled is admitted, and means for gradually accelerating and expelling the medium from the chamber, comprising concentric rows of nozzles of different lengths, and of different areas and expansion ratios, the shorter nozzles being located at the outer edge of the group and having the smaller areas and the smaller expansion ratios.

3. In combination in an apparatus of the character described, a chamber having a port through which medium to be expelled is delivered, means for admitting an expelling fluid to said chamber, and for gradually accelerating the medium in the chamber to substantially the velocity of the fluid, by means of groups of nozzles having different expansion ratios.

4. In combination in an apparatus of the character described, a chamber having a port for admitting medium to be expelled, means for delivering an expelling fluid to said chamber, and for increasing the entraining effect of the fluid delivered, comprising nozzles of different areas and different expansion ratios.

5. In combination in an apparatus of the character described, a chamber having a port for admitting medium to be expelled, means for admitting a jet of expelling fluid to said chamber, and accelerating or entraining nozzles for delivering fluid to said chamber so proportioned as to cause free expansion of the fluid within the chamber.

6. In combination in an apparatus of the character described, a chamber having a port through which medium to be expelled is admitted, an accelerating nozzle for delivering a jet of fluid to said chamber, so formed as to cause a free expansion of the fluid in the chamber, in combination with a nozzle for delivering expelling fluid to said chamber so formed as to substantially completely expand the fluid delivered thereby to the normal working pressure of the chamber.

7. In an ejector, a casing provided with means for the ingress and egress of the fluid to be translated and means for providing within said casing a central jet of relatively high-velocity impelling fluid and a surrounding jet of relatively low-velocity impelling fluid.

8. In an ejector, a casing provided with means for the ingress and egress of the fluid to be translated and means for providing within said casing a jet of relatively high-velocity impelling fluid and an adjacent jet of relatively low-velocity impelling fluid.

9. In an ejector, a casing provided with ports for the ingress and egress of the fluid to be translated and means for providing within said casing a central jet of impelling fluid of relatively high velocity and aimed substantially toward said egress port and for providing an additional jet of impelling fluid therearound of relatively low velocity and containing striæ directed substantially toward said egress port and additional striæ directed at an angle to said first named striæ.

10. In combination in an apparatus of the character described, a casing having inlet means through which a relatively low-pressure medium to be translated is admitted and means associated with the casing for translating the medium to a region of relatively high pressure, including a common high pressure fluid-supply chamber and a group of nozzles of different cross-sectional areas communicating therewith, the outer nozzles of the group having smaller cross-sectional areas than the inner nozzles, whereby the medium to be translated is entrained and accelerated by jets from the outer nozzles with a small expenditure of motive fluid prior to being subjected to an ejecting action by jets from the inner nozzles.

11. In combination in an apparatus of the character described, a casing having inlet means through which a relatively low-pressure medium to be translated is admitted, and means associated with the casing for translating the medium to a region of relatively high pressure, including a group of nozzles of different lengths and of different cross-sectional areas, the outer nozzles of the group being of the lesser lengths and having the smaller cross-sectional areas.

12. In combination in an apparatus of the character described, a casing having inlet means through which a relatively low-pressure medium to be translated is admitted, and means associated with the casing for translating the medium to a region of relatively high pressure, including a group of nozzles of different lengths and of different cross-sectional areas and expansion ratios, the outer nozzles of the group being of the lesser lengths and having the smaller areas and expansion ratios.

13. In combination in an apparatus of the character described, a casing having inlet means through which a relatively low-pressure medium to be translated is admitted, and means associated with the casing for translating the medium to a region of relatively high pressure, including a common high-pressure fluid supply chamber and annular rows of nozzles of different cross-sectional areas communicating therewith, the nozzles of the outer row having the smaller cross-sectional areas, whereby the medium to be translated is entrained and accelerated by jets from the outer nozzles with a small expenditure of motive fluid prior to being subjected to an ejecting action by jets from the inner nozzles.

14. In combination in an apparatus of the character described, a casing having inlet means through which a relatively low-pressure medium to be translated is admitted, and means associated with the casing for translating the medium to a region of relatively high pressure, including annular rows of nozzles of different lengths and of different cross-sectional areas, the nozzles of the outer row being the shorter and having the smaller cross-sectional areas.

15. In combination in an apparatus of the character described, a casing having inlet means through which medium to be translated is admitted, and means associated with the casing for accelerating and ejecting the medium, including annular rows of nozzles of different lengths and of different areas and expansion ratios, shorter nozzles being located in the outer row and having smaller areas and smaller expansion ratios.

16. In combination in an apparatus of the character described, a casing having inlet means through which a relatively low-pressure medium to be translated is admitted and means associated with the casing for translating the medium to a region of relatively high pressure, including a common high-pressure fluid supply chamber and groups of nozzles having different expansion ratios communicating therewith, whereby the medium to be translated is subjected to relatively low velocity jets for entrainment and to relatively high velocity jets for ejection from the apparatus.

17. In combination in an apparatus of the character described, a casing having inlet means through which medium to be translated is admitted and means for admitting an ejecting fluid to said casing and for accelerating the medium to substantially the velocity of the fluid, including a common fluid supply chamber and a plurality of nozzles having different expansion ratios communicating therewith, whereby the medium to be translated is subjected to relatively low velocity jets for entrainment and to relatively high velocity jets for ejection from the apparatus.

18. In combination in an ejector of the character described, a casing having inlet means for admitting medium to be translated, and means associated with the casing for translating the medium including a supply means for pressure fluid, and accelerating or entraining nozzles communicating with said supply means and so proportioned as to cause within the nozzles an incomplete expansion of the fluid.

19. In combination in an ejector of the character described, a casing having inlet means for admitting medium to be translated, and means associated with the casing for translating the medium, including a supply means for pressure fluid, accelerating or entraining nozzles communicating with said supply means and so proportioned as to cause within the nozzles an incomplete expansion of the fluid, and an ejecting nozzle means communicating with said supply means and so proportioned as to expand the fluid delivered thereby to approximately the normal working pressure within the casing.

20. In an ejector, the combination of a diffuser, medium-admitting means communicating with the diffuser, a plurality of expanding nozzles discharging relatively low-velocity motive fluid for imparting velocity and kinetic energy to and increasing the velocity and kinetic energy of the medium, and main expanding nozzle means for discharging relatively high-velocity motive fluid against the moving mass of motive fluid and medium to increase the kinetic energy and velocity thereof suitable for velocity-pressure conversion in the diffuser.

21. In an ejector, the combinaion of a diffuser, medium-admitting means communicating with the diffuser, a plurality of nozzles for discharging motive fluid for adding velocity to and increasing the velocity of the medium, main nozzle means for discharging motive fluid against the moving mass of medium and motive fluid for increasing the velocity thereof suitable for velocity-pressure conversion in the diffuser, said first nozzles being so inclined as to direct the moving motive fluid and medium into the path of the motive fluid discharged from the main nozzle means.

22. In an ejector, the combination of a diffuser, medium-admitting means communicating with the diffuser, a series of small expanding nozzles for converting pressure energy of the motive fluid into velocity and discharging to entrain the medium to impart velocity thereto, and a main expanding nozzle structure discharging motive fluid at relatively high velocity against the medium and motive fluid moving at a relatively lower velocity, to increase the velocity thereof for velocity-pressure conversion in the diffuser.

23. In an ejector, the combination of a diffuser, medium-admitting means communicating with the diffuser, a plurality of expanding nozzles discharging motive fluid for imparting velocity to and increasing the velocity of the medium, and main nozzle means for discharging motive fluid which increases the velocity of the mixture of motive fluid and medium for velocity-pressure conversion in the diffuser, said first nozzles having smaller expansion ratios than the main nozzle means.

24. In an ejector, the combination of a diffuser, medium-admitting means communicating with the diffuser, a plurality of expanding nozzles discharging motive fluid for imparting velocity to and increasing the velocity of the medium, and main nozzle means for discharging motive fluid which increases the velocity of the mixture of motive fluid and medium for velocity-pressure conversion in the diffuser, said first nozzles so dimensioned as to discharge relatively small amounts of motive fluid.

25. In an ejector, the combination of a diffuser, medium-admitting means communicating with the diffuser, main nozzle means substantially co-axial with and discharging motive fluid into the diffuser, and a series of nozzles surrounding the main nozzle means for entraining and accelerating the medium before being submitted to the action of the motive fluid from the main nozzle, the nozzles of the said series being dimensioned so as to discharge relatively small amounts of motive fluid.

26. In an ejector, a casing having inlet and outlet means for the fluid to be translated, means associated with the casing for translating the medium, including a common fluid supply chamber and a plurality of nozzles arranged in a group of polygonal section communicating therewith and having at least one substantially centrally disposed nozzle and surrounding nozzles, the surrounding nozzles having smaller cross-sectional areas, whereby the medium to be translated is entrained and accelerated by jets from the surrounding nozzles with a small expenditure of motive fluid prior to being subjected to an ejecting action by a jet from the centrally disposed nozzle.

27. In an ejector, a casing having inlet and outlet means for the fluid to be translated, means associated with the casing for translating the medium, including a plurality of nozzles arranged in a group of polygonal section having at least one substantially centrally disposed nozzle and surrounding nozzles, the surrounding nozzles being shorter and having smaller cross-sectional areas.

28. In an ejector, a casing having inlet and outlet means for the fluid to be translated, means associated with the casing for translating the medium, including a plurality of nozzles arranged in a group of polygonal section having at least one substantially centrally disposed nozzle, and surrounding nozzles, the surrounding nozzles having smaller cross-sectional areas and having smaller expansion ratios.

29. In combination in an apparatus of the character described a chamber, a nozzle for expanding expelling fluid delivered to the chamber and having means for varying the effective discharge area thereof in response to variations in the initial or final pressure of the fluid being expanded.

30. In combination in an apparatus of the character described, an expansion nozzle having means for varying its expansion ratio in response to variations in the initial or final pressure of the fluid passing therethrough.

31. In combination in an apparatus of the character described, a chamber, from which medium is to be expelled, a nozzle for expanding and delivering expelling fluid to the chamber, having means for varying the expansion ratio in response to variations in the initial or final pressure of the fluid, by admitting fluid from said chamber through filler openings along the nozzle.

32. A fluid discharge nozzle having a mouth piece divergent toward the outlet provided with openings located intermediate the inlet and outlet ends thereof for admitting or discharging a small quantity of fluid to or from the nozzle in response to variations in the difference in pressure between the inlet and outlet ends thereof.

33. A fluid nozzle having openings along the mouth piece thereof, and means for permitting a flow of fluid through the openings into the nozzles, but for preventing a flow of fluid through the openings from the nozzle.

34. An ejector comprising central nozzle structure, a group of nozzles surrounding said nozzle structure, and a common pressure fluid supply chamber for the nozzles, the throat area of said central nozzle structure being greater than the throat area of any nozzle of the said group of nozzles.

35. An ejector comprising a diffuser structure, a short nozzle structure and a long nozzle structure operatively associated with said diffuser structure, said long nozzle structure discharging fluid nearer the throat of said diffuser structure than said short nozzle structure, and a common pressure fluid supply chamber for said nozzle structures, the throat area of said long nozzle structure being greater than the throat area of said short nozzle structure.

36. An ejector comprising diffuser structure, short nozzle structure and long nozzle structure operatively associated with said diffuser structure, said short nozzle structure comprising a group of nozzles, said long nozzle structure discharging motive fluid nearer the throat of said diffuser than any of the nozzles of the short nozzle structure, and a common pressure fluid supply chamber for the nozzle structures, the nozzles of the short nozzle structure being dimensioned so as to discharge a relatively small amount of motive fluid with respect to that discharged by the long nozzle structure.

37. In an ejector, a casing defining a combining chamber and a diffuser communicating one with the other to form a converging-diverging passage therethrough, a long nozzle projecting well into the converging portion of the said passage, a short nozzle discharging into said combining chamber, and a common pressure fluid supply chamber for the said nozzles, the throat area of said short nozzle being materially less than the throat area of said long nozzle.

38. In an ejector, a casing defining a combining chamber and a diffuser communicating one with the other to form a converging-diverging passage therethrough, short nozzle structure comprising a group of nozzles, long nozzle structure projecting well into the converging portion of said passage and discharging nearer the throat thereof than said nozzles of said short nozzle structure, the short nozzle structure being so dimensioned with respect to the long nozzle structure as to discharge relatively small amounts of motive fluid with respect to that discharged by the long nozzle structure.

In testimony whereof, I have hereunto subscribed my name this 24th day of February, 1921.

HENRY F. SCHMIDT.